Figure 2:
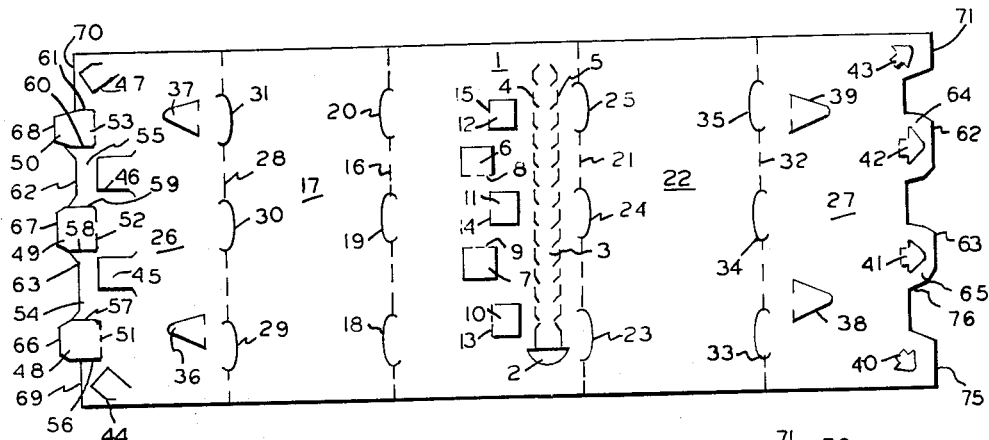

Feb. 8, 1966        P. J. WOOD        3,233,483

METHOD OF DIE CUTTING A BLANK

Original Filed Jan. 7, 1963

INVENTOR
PRENTICE J. WOOD

BY *Walter M. Rodgers*

ATTORNEY

United States Patent Office 3,233,483
Patented Feb. 8, 1966

3,233,483
METHOD OF DIE CUTTING A BLANK
Prentice J. Wood, Jonesboro, Ga., assignor to
The Mead Corporation, a corporation of Ohio
Original application Jan. 7, 1963, Ser. No. 249,903, now Patent No. 3,122,302, dated Feb. 25, 1964. Divided and this application June 17, 1964, Ser. No. 375,820
2 Claims. (Cl. 83—32)

This invention relates to a method of die cutting a blank and is particularly adaptable for use in connection with a blank of the type used in forming a wrapper about a group of articles to be packaged. This application is a division of U.S patent application Ser. No. 249,903, filed January 7, 1963, now Patent No. 3,122,302.

Article carriers of the type disclosed in U.S. Patent 2,786,572 issued March 26, 1957 on an application filed by Hermond G. Gentry and owned by the assignee of this invention ordinarily are formed of paperboard blanks which are die cut from a sheet of paperboard. Since the blanks must necessarily be accurately dimensioned in order properly to accommodate various machine operations used to form the package, it is customary to stamp out each individual blank by one cutting operation of the cutting machine. Such a procedure necessarily results in scrap material along the edges of adjacent blanks. This scrap material not only is waste in itself but it poses a problem insofar as its disposition is concerned.

A principal object of the invention is to effect substantial economy in the use of material used in making wrapper blanks by eliminating the scrapping of strips about each blank edge and also by nesting one blank with an adjacent blank and at the same time to configure the nested edges so as to form carton locks and a flexible center keel for the carton.

Another object of the invention is the provision of an improved method for die cutting carton blanks in which certain overall dimensions of the blank are accurately controlled and in which certain other overall dimensions may be allowed to vary thereby to effect economies in the use of material and in production time.

The invention in one form as applied to a wraparound type of blank resides in the method of die cutting the wrapper blank wherein certain overall dimensions are accurately controlled due to the fact that such dimensions are preserved by a single cutting stroke of the cutting die and wherein certain other adjacent parts of the blank are not cut until a subsequent operation of the die, such subsequent operations being effective to cut parts of the blank the dimensions of which may be allowed to vary within certain predetermined limits. While the method of this invention is particularly adapted for manufacturing blanks for use in forming wrappers for packaging a plurality of articles in an open ended tubular type wrapper, it will be understood that the invention is not limited to such a blank and is applicable to other blanks as well.

Figure 3:
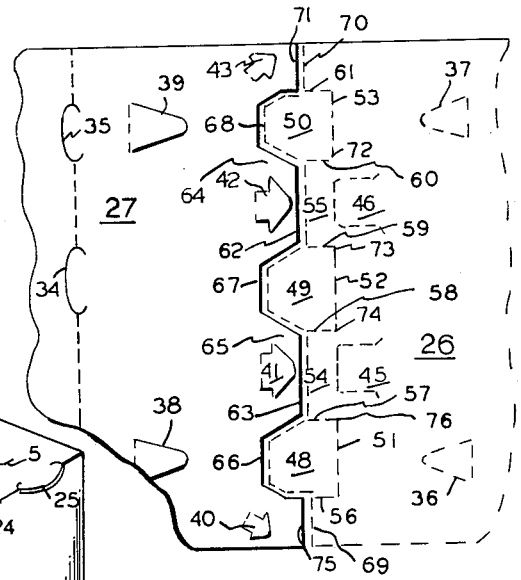
Figure 1:
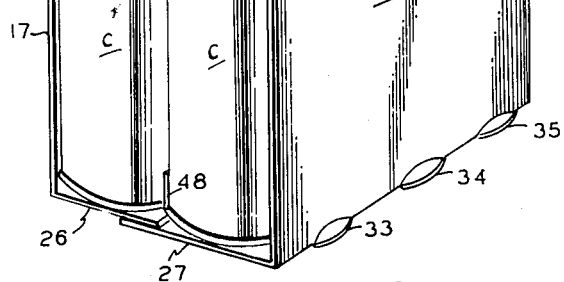

For a better understanding of the invention reference may be had to the following detailed description taken in conjunction with the accompanying drawings in which FIG. 1 is a perspective view of a package formed from a wrapper constructed according to the invention; FIG. 2 is a plan view of a blank formed according to the invention and depicted in FIG. 1; and in which FIG. 3 is an enlarged fragmentary view of one end of the blank as depicted in FIG. 2 shown in solid lines in nested relation to the other end of an adjacent blank shown in dotted lines.

With reference to FIGS. 1 and 2, the numeral 1 is used to designate the main panel of the blank. As shown in FIG. 1 main panel 1 is the top of the package although it will be understood that main panel 1 could constitute the bottom or even one of the sides of the package. Main panel 1 is provided with a tear aperture 2 which communicates with a pull tab 3 defined between a pair of rows of slits 4 and 5. As is well known a finger may be inserted into the opening 2 and the pull tab 3 may be torn away along the perforated lines 4 and 5 in order to open the package. Also formed in main panel 1 is a pair of finger gripping tabs 6 and 7 which are struck out of the main panel 1 and foldably joined thereto along fold lines 8 and 9, respectively. As is well known these tabs 6 and 7 define finger gripping apertures by which the package may be readily carried. Also formed in the main panel 1 is a plurality of partitioning tabs 10, 11 and 12 which are struck out of the main panel and foldably joined thereto along the fold lines 13, 14 and 15. As is well understood in the art these tabs are folded inwardly and serve to separate the packaged articles in one row from adjacent articles in the other row.

Foldably joined to one edge of the main panel 1 along fold line 16 is a side panel 17. Disposed along fold line 16 is a plurality of slits 18, 19 and 20. As is well known the slits 18, 19 and 20 receive the chimes of cans which may constitute the packaged items. Foldably joined to the opposite edge of the main panel 1 along fold line 21 is the side panel 22. Formed along the fold line 21 is a plurality of chime receiving slits 23, 24 and 25.

As is best shown in FIG. 1 the bottom of the carton as there depicted is a composite panel formed of a pair of lap panels 26 and 27. As is clearly shown in FIG. 2, lap panel 26 is foldably joined to the bottom edge of side panel 17 by fold line 28 and a plurality of chime receiving slits 29, 30 and 31 are formed along the fold line 28. In like fashion lap panel 27 is foldably joined to the bottom of side panel 22 along fold line 32 and slits 33, 34 and 35 are formed along fold line 32.

For the purpose of enabling machine elements to tighten the wrapper blank about a group of packaged items, tightening apertures are formed in lap panel 26 and are designated by the numerals 36 and 37. In like fashion tightening apertures 38 and 39 are formed in lap panel 27. Machine elements enter apertures 36 and 37 and draw lap panel 26 toward lap panel 27 while machine elements which are disposed within tightening apertures 38 and 39 draw lap panel 27 toward lap panel 26 in parallel relation.

After the wrapper is tightened about a group of articles to be packaged it is secured by means of locking tabs 40, 41, 42 and 43 which are inserted respectively into the openings defined by retaining tabs 44, 45, 46 and 47 respectively. The particular cooperation of the locking and retaining tabs is disclosed in the aforementioned Gentry Patent 2,786,572. It will be understood of course that panel 26 is disposed inwardly of panel 27 so that machine elements may engage the locking tabs 40, 41, 42 and 43 and drive them into the openings defined by the retaining tabs and thereby to secure the wrapper about the articles packaged therein.

For the purpose of separating the bottom edge of each article in one row from the bottom edge of the adjacent article in the other row, a plurality of keel tabs 48, 49 and 50 are foldably joined to one edge of the lap panel 26 along the fold lines 51, 52 and 53, respectively. Interposed between the keel tabs 48 and 49 is a reinforcing panel 54 and a similar reinforcing panel 55 is interposed between keel tabs 49 and 50. Keel tab 48 is separated from the main body of lap panel 26 by a slit 56 and from the adjacent edge of reinforcing panel 54 by slit 57. In like fashion slits 58 and 59 separate keel tab 49 from reinforcing panels 54 and 55 while slit 60 separates reinforcing panel 55 from keel tab 50 and slit 61 separates keel tab 50 from the main body of lap panel 26. Thus the keel tabs 48, 49 and 50 are freely foldable inwardly along their fold lines 51, 52 and 3 respectively to form multiple separators for the bottoms of the packaged articles in one row and the articles in the adjacent row. From the description thus far it is obvious that the tabs 48, 49 and 50 condition the lap panel 26 for ready flexibility and thereby greatly facilitate the formation of the wrapper about a group of packaged items.

In accordance with one facet of the invention reinforcing panels 54 and 55 are disposed immediately adjacent the openings defined by retaining tabs 45 and 46. These reinforcing panels 54 and 55 lie flat in the same plane as the main body of lap panel 26 and when the locking tabs 41 and 42 are inserted within the openings defined by retaining tabs 45 and 46 substantial added strength is afforded by the reinforcing panels 54 and 55. The strength added by the flat panels 54 and 55 is considerably greater than the strength of a common center keel wherein the entire keel is disposed in generally normal relation to the lap panel 26.

In accordance with one facet of the invention, substantail economies of material and production time are effected by the invention due to the fact that one end of the blank as depicted in FIG. 2 can be nested with an adjacent end of an adjacent blank so as to eliminate material wastage without impairing the dimensional control of the blank. More specifically it is necessary to maintain accurate dimensioning between the outwardly extending edges 62 and 63 of the protrusions 64 and 65 formed along one edge of lap panel 27 and the outer edges 66, 67 and 68 of the keel tabs 48, 49 and 50, respectively. For this reason it is necessary to die cut the lines 66–68 and 62 and 63 by a single stroke of the cutting die. Thus in accordance with one facet of the invention having to do with the method of manufacturing the blank depicted in FIG. 2, and assuming motion of the blank from right to left relative to a cutter element, a single operating stroke of the die cutter is utilized to make every cut line in and along the edges of panel 26 including lines 69, 70, tabs 44–50 and apertures 36 and 37, except the lines 62 and 63. During such cutting stroke the only lines cut along the trailing edge of panel 27 are lines 62 and 63. In this way the spacing between edges 66–68 of tabs 48–50 in panel 26 is maintained at a desired and constant magnitude with respect to edges 62 and 63 of protrusions 64 and 65 on panel 27. As a matter of practice it has been found desired to cut tightening apertures 38 and 39 as well as locking tabs 40–43 during the stroke being presently described.

Thereafter, the cutter withdraws and the blank advances one step to the left and the cutting stroke is repeated. This repeat stroke again cuts all lines in panel 26 of the next blank except the lines 62 and 63 which were cut by the previous stroke of the cutter. This repeat stroke thus separates the blank under the cutter from the preceding blank.

Of course, it will be understood that lines such as 70 and 69 of one blank correspond respectively to cut lines 71 and 75 of an adjacent blank. Preferably the ends of slits 62 and 63 extend into the keel tabs 48, 49 and 50 as shown to insure that a clean cut will be positively made.

In FIG. 3 the end of tab 46 is shown coinciding with the end 72 of hinge line 53 and with end 73 of hinge line 52. This is an incidental showing and it will be understood that such coincidence is not necessary. Likewise, the end of tab 45 may but need not coincide with a line connecting points 74 and 76.

From the above description it is apparent that substantial economy of material and of production time are effected.

While I have shown and described a particular form of the invention, I do not wish to be limited thereto and intend in the appended claims to cover all changes and modifications which fall within the true spirit and scope of the invention.

The embodiments of the invention in which an exclusive property or privilege is claimed are defined as follows:

1. A waste free method of die cutting a blank having irregularly configured leading and trailing edges disposed in generally transverse relation to the direction of feed thereof and wherein the dimension of the blank in the direction of feed between certain portions on the leading and trailing edges must be accurately controlled and wherein the dimension of the blank in the direction of feed between other portions on the leading and trailing edges may vary somewhat, the method comprising simultaneously cutting said certain portions on both the leading and trailing edges of a particular blank without cutting said other portion along said leading and trailing edges, advancing the blank so as to bring a succeeding blank into approximate registry with the die, and then cutting said other portion along the trailing edge of said particular blank and along the leading edge of said succeeding blank, the particular disposition of said other portion of each blank being dependent at least in part on the amount of feed thereof and the leading edge of a particular blank being nested without waste with the trailing edge of the preceding blank.

2. A waste free method of die cutting a generally rectangular blank having irregularly configured leading and trailing edges disposed in generally normal relation to the direction of feed of the blank and wherein the spacing between certain outwardly protruding portions on said leading and trailing edges must be accurately controlled, the method comprising cutting said outwardly protruding portions on both the leading and trailing edges of the blank with the same operating stroke of the die but without cutting another portion along the leading and trailing edge of the blank, advancing the blank through a distance corresponding generally to the spacing between its leading and trailing edges, and then cutting said another portion along the trailing edge of the blank by a succeeding operating stroke of the die so that the leading edge of a particular blank nests without waste with the trailing edge of the preceding blank.

References Cited by the Examiner
UNITED STATES PATENTS

| 2,172,988 | 9/1939 | Ponndorf | 83—43 |
| 2,480,721 | 8/1949 | Egenolf | 83—32 X |
| 2,600,834 | 6/1952 | Blair | 83—43 X |

WILLIAM W. DYER, Jr., *Primary Examiner.*

ANDREW R. JUHASZ, *Examiner.*